Oct. 10, 1933.   W. R. SCHINDLER   1,929,903
PLANT PROTECTOR AND METHOD OF MAKING IT
Filed Oct. 13, 1931
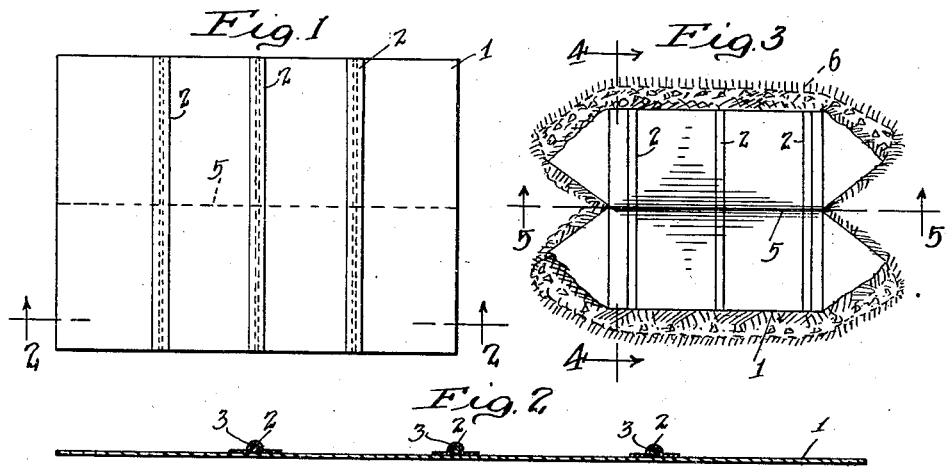
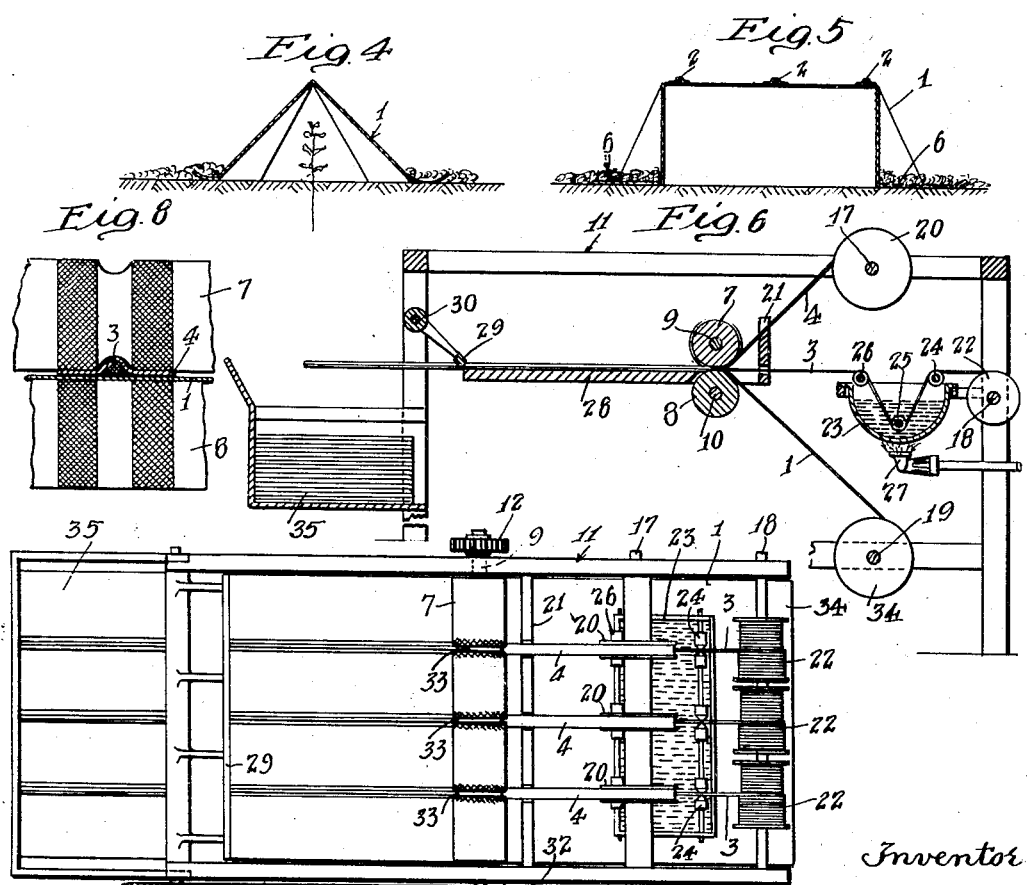

Patented Oct. 10, 1933

1,929,903

UNITED STATES PATENT OFFICE 1,929,903

PLANT PROTECTOR AND METHOD OF MAKING IT

Walter R. Schindler, Los Angeles, Calif.

Application October 13, 1931. Serial No. 568,579

2 Claims. (Cl. 154—40)

This invention relates to devices for the protection of young plants in open fields, and particularly to paper protectors adapted to be used once and then discarded.

An object of the invention is to provide a plant protector of thin transparent paper with integral reinforcing strips that can be very cheaply manufactured and can be readily stored and packed for shipment.

It is present practice in some localities to plant melons and other sensitive plants in open fields early in the season while there is still danger of killing frosts and to protect the young plants until all danger of killing frosts is past, by placing over each plant or small group of plants, a cover made of more or less transparent material, the cover permitting a certain amount of light to reach the plant and at the same time preventing access of cold air to the plant and the rapid radiation of heat from the plant during the night.

Plant protectors of the type discussed, have been made of various materials and in various shapes. Some of them have been constructed of wood or fiber with a window of glass or other transparent material, but most of them have probably been made of paper to reduce the expense. Of the paper plant protectors heretofore developed, most of them fall into two classes, namely, those made of relatively heavy paper which are self-supporting, and those made of very thin transparent paper which is not sufficiently stiff to be self-supporting. The devices made of heavy paper are objectionable for the reason that they do not transmit sufficient light to the plant. Those made of thin paper, on the other hand, are objectionable because, as heretofore constructed, they have required separate supporting means to prevent them from collapsing.

One form of supporting means that has been used is a wire bow, the ends of which are inserted in the ground so that the bowed portion projects thereabove and serves as a support for the paper cap. Considerable labor is required to convey these wire bows to the field, to set them and to remove them at the end of the season.

It has also been attempted to construct plant protectors of thin transparent paper with reinforcing strips formed integrally with the protector to avoid the objections attendant upon the use of wire bows described above. All of the devices of this type of which I am aware, are objectionable for the reason that they are fragile and can not be cheaply packed for storage or shipment.

In accordance with the present invention, I have devised a plant protector which comprises simply a rectangular sheet of thin transparent paper with reinforcing strips formed integrally therewith. The positioning of the reinforcing strips is such that the sheet can be readily formed into a plant protector, in the field, by simply bending, placing it over the plant, and securing it in position by laying a little soil over its edges. Since the devices as manufactured are in the form of a flat sheet, they can be economically packed for shipment or storage.

Another important advantage of the device is that it can be very cheaply manufactured by quantity production methods. This is a most important factor inasmuch as paper plant protectors are commonly discarded at the end of each season and new ones used each year.

Other objects and advantages of my invention will be apparent from the following detailed description taken in connection with the drawing, in which:

Figure 1 is a plan view of a protector in accordance with my invention;

Figure 2 is a sectional view in plane 2—2 of Figure 1;

Figure 3 is a plan view of the protector indicating its appearance when set over a plant;

Figure 4 is a vertical section in the plane 4—4 of Figure 3;

Figure 5 is a vertical section in plane 5—5 of Figure 3;

Figure 6 is an elevational section view of a machine for constructing the protector;

Figure 7 is a plan view of the machine; and

Figure 8 is a detail elevational view of the rolls in the machine.

Referring to Figure 1, my plant protector comprises a rectangular sheet 1 of thin transparent paper of the type sold under the tradename of "Glassine." The sheet may be made of any desired dimensions, but is preferably of oblong shape as illustrated. To reinforce the sheet and make it self-supporting, reinforcing strips 2 are secured thereto as shown in Figures 1 and 2. These strips each comprise a cord 3 overlapped with a strip of paper 4, both the cord and paper being secured to the sheet with some adhesive substance, preferably tar, since the latter has considerable body, thus tending to materially stiffen the sheet itself, and also being water-proof.

The protector described is manufactured, packed and shipped in flat form as shown. In use, it is bent to form an A-shaped enclosure as shown in Figures 3, 4 and 5. In converting the flat sheet into the form shown in the latter figures, an operator first creases the sheet longitudinally down its center along the dotted line 5 shown in Figure 1 and bends the sheet into the form of an inverted V which is then set over the plant, and the outer margins 6 flattened down and covered with soil as shown in Figure 4 to prevent it collapsing.

The middle end portions of the sheet are then bent down so that the portion of the sheet along the line 5 extending beyond the end reinforcing strips 2 is creased opposite in direction to that portion forming the ridge of the cover. This leaves the rest of the end portion projecting out from the end reinforcing strips as shown in Figures 3 and 5. The ends are then secured in position by forcing soil over the end margins and against the middle end portion as shown.

A plant protector as described, is very serviceable since the margins of the sheet are held firmly in position by the soil thrown over the edges, and the roof portion is prevented from collapsing by the reinforcing strips 2 comprising the cords 3, paper strips 4, and the stiff tar binding the whole together. The reinforcing strips are relatively narrow, thus permitting ample sunlight to penetrate through the thin paper 1 to the plant and the ground around the plant beneath the cover.

Plants that are inclosed in a cover as described, become relatively sensitive to cold and light and it is desirable to harden them by a gradual exposure to light and air rather than by completely removing the cover.

With the present device, plants may be partly exposed to air for some time before the cover is completely removed by pulling out one end of the cover, thus leaving that end open for the admission of air to the plant.

It is to be noted that the reinforcing strips 2 extend completely to the edge of sheet 1 so that when the protector is set up as shown in Figures 3 to 5 the ends of the reinforcing strips adjacent the outer margins of the sheet are held down by the soil thrown over the edge of the sheet. This is advantageous for the reason that the thin transparent paper of the type preferable for use in plant protectors rots rather quickly when in contact with moist soil. The reinforcing strips, however, being impregnated with tar are relatively resistant to decay in contact with the soil; hence, even though the paper along the margin rots completely away, the embedded ends of the reinforcing strips 2 hold the protector in place and prevent it being blown away from the plant.

Reinforced sheets as disclosed in Figure 1 can be conveniently made continuously with a machine as illustrated in Figures 6 and 7.

This machine comprises a pair of rolls 7 and 8 mounted to rotate on shafts 9 and 10 respectively which are journaled in a frame designated generally at 11. Shafts 9 and 10 are provided with gears 12 on the ends thereof which mesh with each other and force both rolls to rotate at the same speed in opposite directions. A sprocket wheel 13 is further provided on the opposite end of the upper shaft 9 and is connected by a chain 14 to a sprocket wheel 15 on a motor 16. Three shafts 17, 18 and 19 are also attached to the frame 11 of the machine.

Shaft 17 supports a plurality of spools 20 carrying reinforcing tape which is fed through guide 21 between the rolls. Shaft 18 supports a plurality of spools 22, each of which carries cord which is also fed through guide 21 to rolls 7 and 8, and shaft 19 carries a single large roll of suitable thin transparent paper which is fed between the rolls 7 and 8.

Intermediate between shaft 18 and the guide 21 there is provided a vessel 23 containing tar or other suitable adhesive, through which cord fed from spool 22 is guided by pulley guides 24, 25, and 26. A gas jet 27 is provided to heat the tar or other adhesive material in the vessel 23.

On the output side of rolls 7 and 8, a table 28 is provided and a rotating knife 29 affixed to shaft 30 is positioned to swing past the end of table 28 for the purpose of shearing off the sheet material fed over the table. Shaft 30 is rotatably mounted in the frame 11 of the machine and is provided on one end with a sprocket wheel 31 which is connected by a chain to sprocket wheel 32 on the shaft 9.

The upper roll 7 is provided with three peripheral grooves 33 and the rolls are knurled along the margins of the grooves 33 as disclosed in Figure 7. The lower roll 8 is also knurled at points on either side of the groove 33 in the upper roll. In operation, the rolls 7 and 8 are continuously rotated by the motor 16 to feed paper strips from the roll 20, cords from the spools 18 and paper sheet from the roll 34 between the rolls and onto the table 28. The knife 29 is simultaneously rotated through shaft 30 by sprocket wheel 31 to move past the end of table 28 and shear off sections of the sheet as it is fed past table 28.

As the cords are drawn from spools 18 through vessel 23 they become impregnated with the tar in the vessel and are thereafter guided by guides 21 to pass between the rolls 7 and 8 under the grooves 33 in the upper roll. At the same time the paper strips from spools 20 are guided by guides 21 to pass between the rolls at the grooves 33 so that the upper roll forces the paper strips firmly about the cord and against the sheet 1.

The depths of grooves 33 are so proportioned with respect to the size of the cords that the cords are compressed and a portion of the tar forced out of them between the strips 4 and the sheet 1. Furthermore, the knurled surfaces of the rolls permit a certain amount of tar to remain between the strips 4 and the sheet 1 to increase the stiffening effect of the cords and strip 4.

After passing between rolls 7 and 8, the sheet 1, strips 4 and cords 3 emerge in the form shown in Figures 1 and 2 and are fed out over the table 28. The regular rotation of shaft 30 brings knife 29 periodically past the edge of the table 28 and shears off the finished sheets which are thrown by the knife 29 into a stack 35.

It will be understood that by altering the relative sizes of the sprocket wheels 31 and 32 on the knife shaft 30 and the upper roll shaft 9, the speed of rotation of knife 29 may be regulated to cut sheets of any desired width.

I claim:

1. The method of manufacturing a paper sheet having an integral reinforcement comprising a cord held to said paper by a strip of paper and a binder, which method comprises continuously feeding paper, paper strips and cord together, continuously impregnating said cord with a binding agent in liquid or plastic form, immediately laying said impregnated cord against said sheet, continuously laying said paper strip over said cord and thereafter compressing said strip about said cord and against said sheet whereby a part of the binder is forced out of said cord and between said strip and sheet and the strip is molded about said cord.

2. The method of manufacturing a sheet having an integral reinforcement comprising a filamentary element held to the sheet by a strip of sheet material and a binder, which method comprises continuously feeding said sheet, filamentary element and strip, continuously applying a binding agent in liquid or plastic form to said filamentary element, continuously laying said treated element between said sheet and strip and thereafter continuously compressing said strip about said element and against said sheet whereby the strip is molded about said element and a part of the binder adhering to said element is forced between said sheet and strip to bind them directly together.

WALTER R. SCHINDLER.